United States Patent [19]

Sell

[11] Patent Number: 4,554,949
[45] Date of Patent: Nov. 26, 1985

[54] SEWER OUTLET CONNECTING AND CAPPING ARRANGEMENT

[76] Inventor: James Sell, R.R. #3, Box 157, Muncie, Ind. 47302

[21] Appl. No.: 637,552

[22] Filed: Aug. 3, 1984

[51] Int. Cl.⁴ ............................................. F16K 27/12
[52] U.S. Cl. ................................. 137/899; 285/319; 285/355; 285/423; 285/DIG. 2; 138/89
[58] Field of Search .............. 285/DIG. 2, 355, 319, 285/305, 423; 137/899, 351; 138/89

[56] References Cited

U.S. PATENT DOCUMENTS

| 517,192 | 3/1894 | Prior | 285/319 |
|---|---|---|---|
| 763,210 | 6/1904 | Schwamberger et al. | 285/355 |
| 2,919,146 | 12/1959 | Gill | 285/355 |
| 3,623,500 | 11/1971 | Hoy | 137/899 |
| 3,807,774 | 4/1974 | Heath, Jr. | 285/319 |
| 4,083,585 | 4/1978 | Helm | 285/423 |
| 4,133,347 | 1/1979 | Merrer | 137/899 |
| 4,274,455 | 6/1981 | Simons | 138/89 |
| 4,432,394 | 2/1984 | Martin | 138/89 |

Primary Examiner—A. Michael Chambers
Attorney, Agent, or Firm—Roger M. Rickert

[57] ABSTRACT

A four component sewer coupling arrangement for recreational vehicles and the like is disclosed including a recreational vehicle sewer outlet fixed to the vehicle, a threaded closure cap for closing the outlet when the vehicle is in transit, a tether line connecting the closure cap and outlet so that the closure cap is not inadvertently lost or mislaid, and a flexible drain hose having a threaded connector at one end for connecting the drain hose to the outlet when the closure cap is removed so that an end of the flexible drain hose opposite the threaded connector may be connected to a sewage disposal location for discharging sewage from the recreational vehicle by way of the flexible drain hose to the sewage diaposal location. A quick release spring coupling may be substituted for the threads. Both the closure cap and threaded connector are provided with means for facilitating their tightening and loosening relative to the fixed outlet thereby providing a good seal to the outlet.

8 Claims, 5 Drawing Figures

SEWER OUTLET CONNECTING AND CAPPING ARRANGEMENT

BRIEF SUMMARY OF THE INVENTION

The present invention relates generally to arrangements for temporary connection of a self-contained vehicle sewage system to a sewage disposal location as might be required for travel trailers, motor homes or other types of recreational vehicles wherein the vehicle may be frequently disconnected from a given sewage disposal location and moved to another site for reconnection to another sewage disposal system The self-contained vehicle sewage system may include a sewage holding tank and the occasions for coupling the vehicle sewage system to a disposal location may be brief and simply for the purpose of draining the holding tank.

Recreation vehicles such as travel trailer, motor homes and the like have become quite popular in recent years and the more elegant of these recreation vehicles include some sort of self-contained sewage system frequently with a holding tank so that the sewage system may be used either while the vehicle is in transit or when the vehicle is parked but not connected to a fixed sewage disposal location. Of course, the simple dumping of sewage from the vehicle at random locations is unacceptably unsanitary and schemes for connecting the recreational vehicle to a fixed sewage disposal location are known and typically employ either a flexible drain hose, a rigid but telescopically expandable drain pipe, or other line. In either case, the system for coupling the drain hose or pipe to the recreational vehicle sewage outlet has taken the form of a pair of ears or lugs on one of the members and a pair of latching hooks on the other member so that the two members are engaged and twisted slightly through a fraction of a complete revolution to effect the coupling. Such coupling arrangements frequently do not seal well resulting in some sewage leakage during use and further, since the components are typically fabricated from polyvinyl chloride or other plastic material, breakage of the lugs or corresponding hooks is rather commonplace. These same leakage and breakage problems are also experienced when a cap or closure member is substituted for the drain hose or pipe to close the recreational vehicle sewer outlet during vehicle transit or other times when the system is not connected to a sewage disposal location.

Among the several objects of the present invention may be noted the avoidance of the above noted prior art deficiencies; the provision of a coupling arrangement for a self-contained sewage system of a recreational vehicle; the provision of a sewage coupling arrangement of a threaded nature including means integral with the threaded components for facilitating the threaded coupling and decoupling of those components; the provision of a spring latching sewage coupling; and the provision of a sewage coupling arrangement which is readily tightened and loosened by hand without the need of tools. These as well as other objects and advantageous features of the present invention will be in part apparent and in part pointed out hereinafter.

In general, a sewer coupling arrangement in accordance with the present invention includes an open ended recreation vehicle sewer outlet fixed to the vehicle at a location sufficiently low on that vehicle so as to drain the vehicle sewage system with that outlet having an exposed threaded portion near the open end thereof along with a flexible sewer drain hose having a threaded connector at one end matable with the outlet to sealingly connect that drain hose to the outlet so that the hose opposite end may be connected to a sewage disposal location and the vehicle sewage system drained. For transit, a closure cap having a threaded region which can be mated with the outlet threaded portion to sealingly close the outlet is provided and that closure cap may be tethered to the outlet to prevent the cap from being lost or mislaid when not in use.

Also, in general and in one form of the invention a quick release coupling arrangement includes spring portions extending along and beyond a recreational vehicle sewer outlet with those spring portions selectively engaging and securing either a closure cap or drain line to the outlet. In one version, the spring comprises a unitary wire sping having a middle saddle portion for partially surrounding the outlet, and end portions extending beyond the outlet to engage the selected one of the closure cap and drain line. In another form, a plurality of elongated, generally flat springs are uniformly distributed about the outlet having respective first ends fastened to the outlet and respective second ends, including hook portions for engaging either the closure cap or the drain line. Both the closure cap and the drain line may be provided with tapering outer surface portions along which the springs slide during interengagement with the outlet. With this last mentioned arrangement a simple snap action insertion of the closure cap or drain line serves to engage one end of the cap or line with an O-ring type seal seated within the mouth of the cavity deforming that seal and providing the desired connection.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
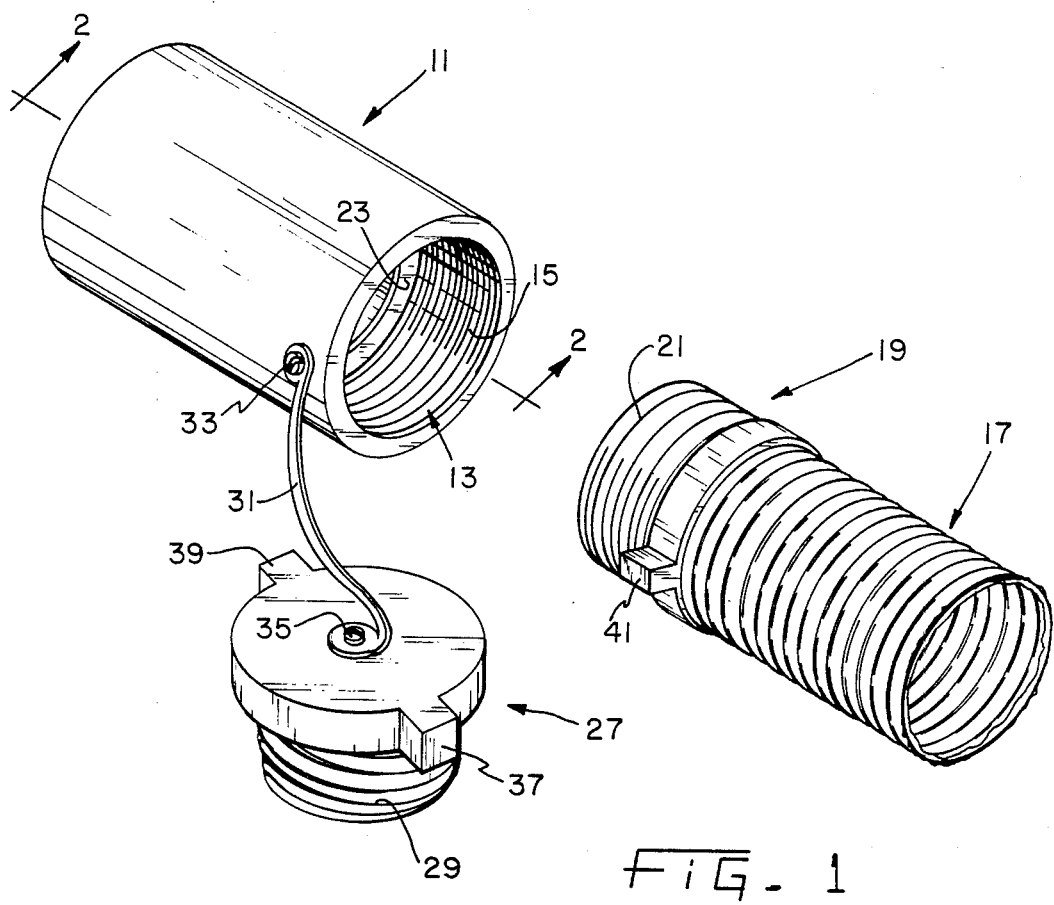
FIG. 1 is an exploded perspective view of the several components of the sewage coupling arrangement of the present invention.

Referring first to FIG. 1, a recreational vehicle sewer outlet 11 has an open end 13 exposed outside the vehicle and with an exposed threaded portion here illustrated as an internal threaded portion 15. The outlet 11 is, of course, positioned in the floor or a lower side wall of the vehicle so as to completely drain the vehicle sewage system. When that system is to be coupled to the sewage disposal location, the flexible drain hose 17 with the threaded connector 19 at one end thereof is connected by threadedly engaging threads 21 of connector 19 with the inner exposed threaded portion 15 of outlet 11 and those threads tightened until sealing between the outlet 11 and drain hose 17 occurs. This sealing may be achieved by either forming the threads 15 and 21 with a slight taper so that, as threaded engagement occurs, a sealing, due to the taper of the threads, is provided or that sealing may be achieved by positioning an annular gasket 23 against a shoulder 25 within outlet 11 to be engaged by the free end of the threaded connector 19 and compressed somewhat to provide the desired seal.

When the drain hose 17 is not in use, it may be removed and stored in a conventional manner and the open end 13 sealingly closed by substituting closure cap 27 which has a threaded region 29 substantially identical to the threaded region 21. Thus, if the system is designed to seal based on tapered threads, both threads 21 and threads 29 are similarly tapered while if the system is designed to seal based on an annular gasket such as 23, the threaded region 29 is of sufficient length to reach into the opening 13 and engage the compress that gasket 23.

When the closure cap 27 is removed, its inadvertent loss is prevented by a tether 31 pivotably attached to the open ended outlet 11 at 33 and pivotably attached to the cap itself at 35 so that the screwing and unscrewing of the cap may occur freely without the tether 31 interferring.

Both the cap 27 and the threaded connector 19 are provided with diametrically opposed lugs 37, 39, 41 and a further lug not visible in FIG. 1. These lugs are present to aid the coupling of flexible hose 17 or cap 29 to the outlet 11 by providing a region where the user can get a good grip on the threaded connector 19 of closure cap 27 to adequately tighten the threaded coupling to provide the desired sealing and after use to unscrew the device. Because of the sealing nature of the arrangement illustrated, a simple hand gripping of a basically round cap of threaded connector may be inadequate to loosen or to adequately tighten the threaded connection.

The lugs 37, 39, 41, etc. could be omitted and their function provided by one or more peripheral notches engagable by a C-shaped spanner wrench or diametrically opposed flat surfaces might be provided to be engaged by a relatively large adjustable end wrench, however, the lugs have been found suitable for most purposes.

Figure 2:
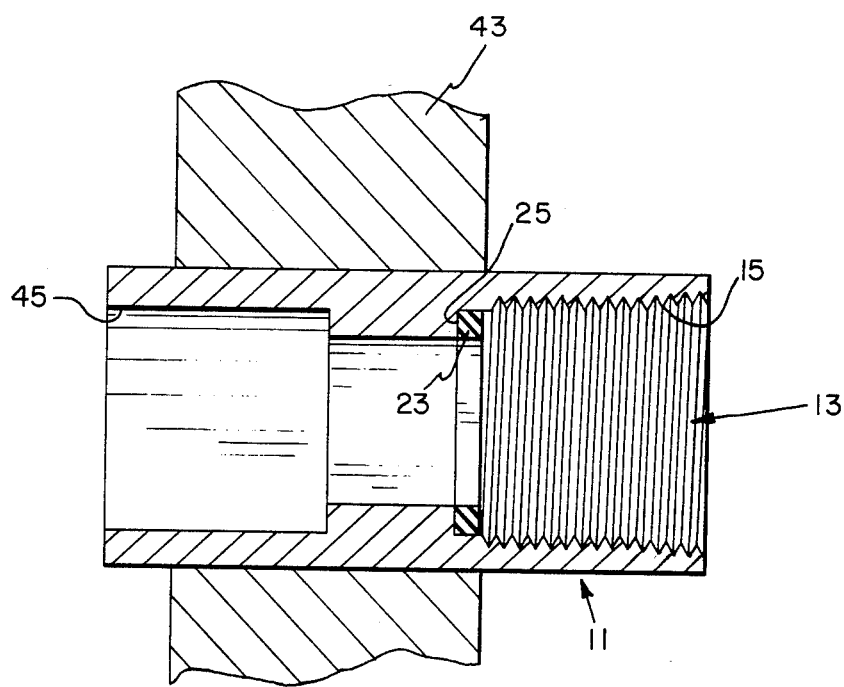
FIG. 2 is a view in cross section along the lines 2—2 of FIG. 1 illustrating the open ended recreational vehicle sewage outlet.

In FIG. 2 the recreational vehicle sewer outlet 11 is depicted in place in a side wall 43 of a recreational vehicle and, of course, the remaining portion of the self-contained sewer system connects to the outlet 11 as, for example, by the insertion of other plastic plumbing pieces into the inner opening 45. FIG. 2 also illustrates the annular gasket seated against the shoulder 25 within the opening 13.

Figure 3:
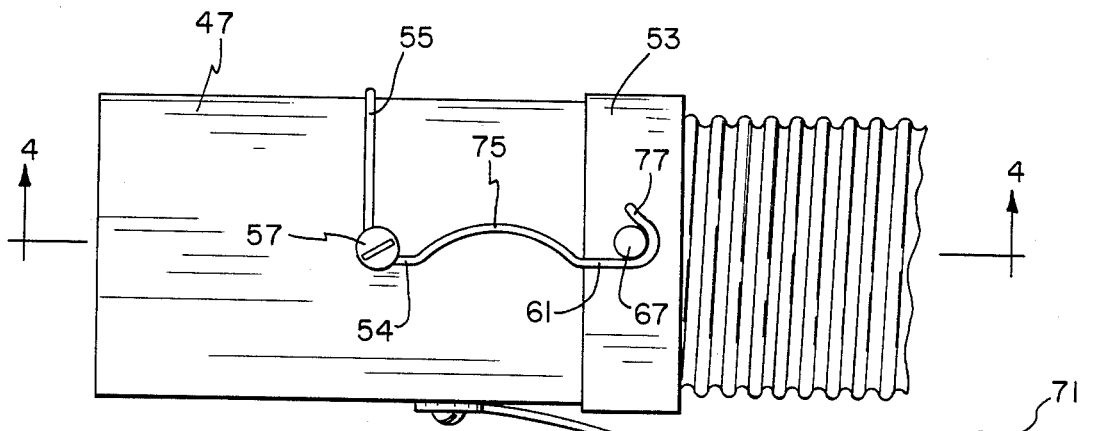
FIG. 3 is a side elevation view of a quick release coupling arrangement with the sewer drain line connected to the sewer outlet on the vehicle and with a closure cap tethered thereto.
Figure 4:
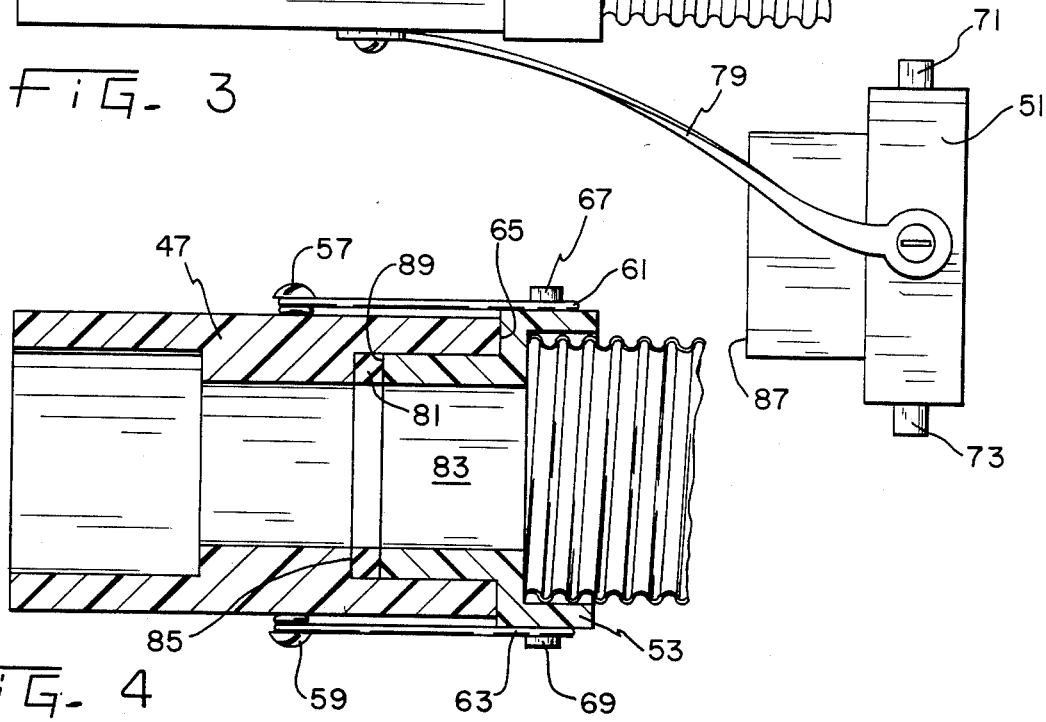
FIG. 4 is a view in cross section along lines 4—4 of FIG. 3.

In FIGS. 3 and 4 the open ended outlet 47 differs from outlet 11 of FIGS. 1 and 2 primarily by the absence of the internal threads 15. This same principal difference will be noted between the outlet of FIGS. 1 and 2 and outlet 49 of FIG. 5. As a substitute for these threads as a means for maintaining either closure cap 51 or end portion 53 of a sewer drain line in contact with the outlet 47, FIGS. 3 and 4 employ a spring 54 having a semicircular saddle portion 55 which partially surrounds outlet 47 and is secured in position by a pair of studs or screws 57 and 59. Spring 54, which in FIGS. 3 and 4 is a unitary wire spring, has end portions 61 and 63 which extend beyond end 65 of the vehicle sewer outlet and engage respective ears or tabs 67 and 69 on the sewer drain line, or 71 and 73 on the closure cap. The unitary wire spring 54 may include a bowed region 75 providing sufficient resilience to deform spring 54 so as to release the hook portion, such as 77, from about the ear or stud 67 to separate the respective parts. A tether 79 analogous to tether 31 of FIG. 1 is also shown. An annular resilient seal 81 is received within the cavity 83 of the sewer outlet and rests on sewer outlet surface 85 as a seat for the seal. When the closure cap 51 or drain line end 53 are inserted into cavity 83, the leading end 87 of the cap or 89 of end 53 engages seal 81 squeezing that seal between the leading end, such as 87 or 89, and the seal seat 85 so as to ensure proper sealing between the members with that deformation of the resilient seal being maintained by spring 54.

Figure 5:
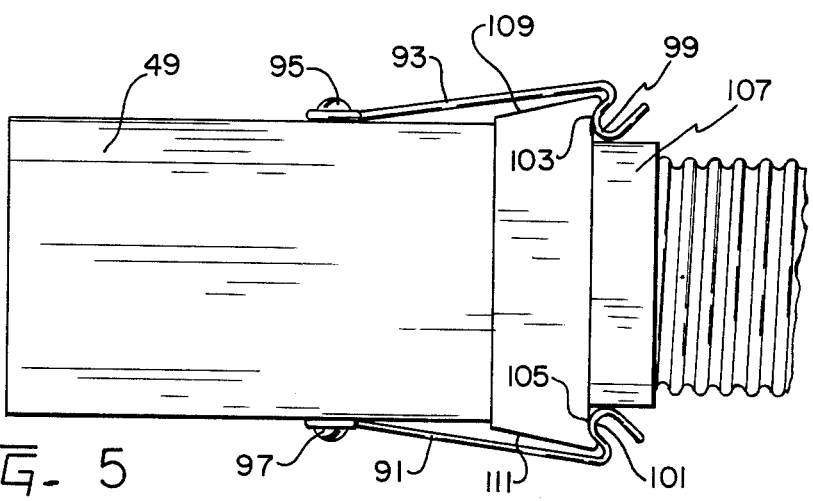
FIG. 5 is a side elevation view similar to FIG. 3 but illustrating a further modification in accordance with the present invention.

FIG. 5 is a view similar to FIG. 3, but for simplicity omitting the tethered closure cap and illustrating a further variation on the spring 54. In FIG. 5, the spring arrangement comprises a plurality of elongated, generally flat springs 91 and 93, which are uniformily distributed about outlet 49. In FIG. 5 two such flat springs are illustrated diametrically opposed to one another. Springs 91 and 93 are fixed to the outlet as by screws or rivets 95 and 97, or may be afixed to the outlet 49 with some amount of limited free movement. In either event, the springs 91 and 93 have hook portions 99 and 101 at their respective free ends, which engage corresponding notches 103 and 105 in end portion 107 of a sewer drain line. End 107 may include tapered outer surface portions 109 and 111, so that when the members 49 and 107 are mated the hook portions 99 and 101 slide along these tapered portions and eventually snap into position within the notches 103 and 105. Springs 91 and 93 in FIG. 5 are substitutes for the wire spring 54 of FIGS. 3 and 4 with the embodiment of FIG. 5 otherwise incorporating the details, such as the annular seal 81 of the previously discussed embodiment.

Thus, the embodiments of FIGS. 3, 4 and 5 rely on the compression of an annular sealing element while eliminating the threaded interconnection of the earlier discussed embodiments and relying on a quick release wire or flat blade spring arrangement to hold the respective members in sealing engagement.

From the foregoing it is now apparent that the novel quickly and easily connected and disconnected sewer coupling arrangement admitting either the connection of a flexible drain hose or a closure cap has been disclosed meeting the objects and advantageous features set out herein before as well as others and that modifications as to the precise configuration, shapes and details may be made by those having ordinary skill in the art without departing from the spirit of the invention or the scope thereof as set out by the claims which follow.

What is claimed is:

1. In recreational vehicle of the type having a self-contained sewage system, a coupling arrangement for selectively connecting the vehicle sewage system to a sewage disposal location when the vehicle is parked at a camp site, service station facility or the like while sealingly closing the vehicle sewage system when the vehicle is in transit comprising:

an open ended recreational vehicle sewer outlet fixed to the vehicle at a sufficiently low location on the vehicle to drain the vehicle sewage system, the outlet having an exposed threaded portion near the open end thereof;

a closure cap having a threaded region matable with the outlet threaded portion to sealingly close the outlet open end;

a tether connecting the outlet and closure cap to prevent the closure cap being lost or mislaid when not threadedly engaged with the outlet;

a flexible sewer drain hose having a threaded connector at one end thereof matable with the outlet threaded portion to sealingly connect the drain hose to the outlet open end whereby the drain hose end opposite the threaded connector may be connected to a sewage disposal location and the vehicle sewage system drained thereinto;

both the threaded connector and the closure cap being provided with diametrically opposed portions which may be selectively engaged to aid turning relative to the threaded portion for facilitating threaded coupling and decoupling of the threaded connector and closure cap with the threaded portion.

2. The coupling arrangement of claim 1 wherein each of the threaded portion, threaded region and threaded connector has a taper to provide the respective sealing closure and sealing connection.

3. The coupling arrangement of claim 1 wherein the exposed threaded portion of the outlet is formed as interior threads extending inwardly from the open end and terminating near a shoulder, and further comprising an annular gasket seated against the shoulder to be engaged and sealingly compressed by one of the threaded connector and closure cap.

4. In a recreational vehicle of the type having a self-contained sewage system, a coupling arrangement for selectively connecting the vehicle sewage system to a sewage disposal location when the vehicle is parked at a camp site, service station facility or the like while sealingly closing the vehicle sewage system when the vehicle is in transit or otherwise disconnected from a disposal location comprising:

an open ended recreational vehicle sewer outlet fixed to the vehicle at a sufficiently low location on the vehicle to drain the vehicle sewage system, the outlet having an enlarged cavity extending inwardly from the open end terminating in an annular seal receiving seat;

an annular resilient seal positioned in the cavity seat;

a closure cap having a first portion thereof adapted to fit snuggly within the enlarged cavity and having an end region of the first portion for engaging and sealingly deforming the seal when so fitted;

a tether connecting the outlet and closure cap to prevent the closure cap being lost or mislaid when not engaged with the seal;

a sewer drain line having a first end portion adapted to fit snuggly within the enlarged cavity and having an end region for engaging and sealingly deforming the seal when so fitted whereby the drain hose end opposite said first end portion may be connected to a sewage disposal location and the vehicle sewage system drained thereinto; and spring means extending along and beyond the outlet for selectively engaging and securing a selective one of the closure cap and drain line to the outlet.

5. The coupling arrangement of claim 4 wherein the spring means comprises a unitary wire spring having a middle saddle portion for partially surrounding the outlet and end portions extending beyond the outlet to engage the selected one of the closure cap and drain line.

6. The coupling arrangement of claim 4 wherein the spring means comprises a plurality of elongated generally flat springs uniformly distributed about the outlet having respective first ends fastened to the outlet and respective second ends having hook portions for engaging the selected one of the closure cap and drain line.

7. The coupling arrangement of claim 6 wherein both the closure cap and drain line are provided with tapered outer surface portions along which the spring second ends slide during interengagement with the outlet.

8. The coupling arrangement of claim 1 wherein the diametrically opposed portions comprise a pair of diametrically opposed outwardly extending lugs on each of the threaded connector and closure cap.

* * * * *